Patented Apr. 1, 1941

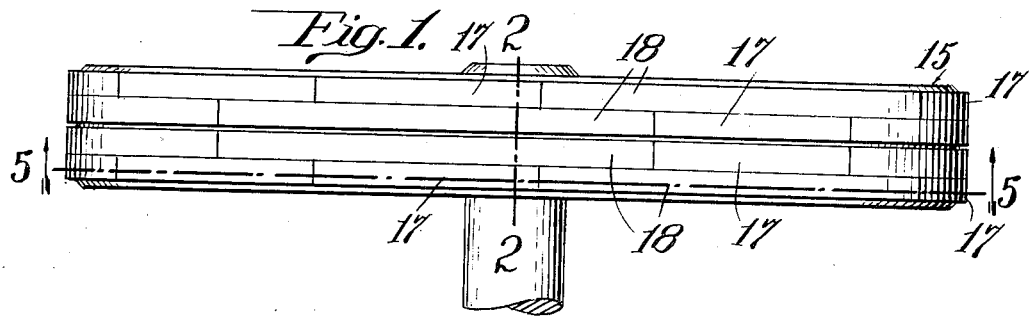
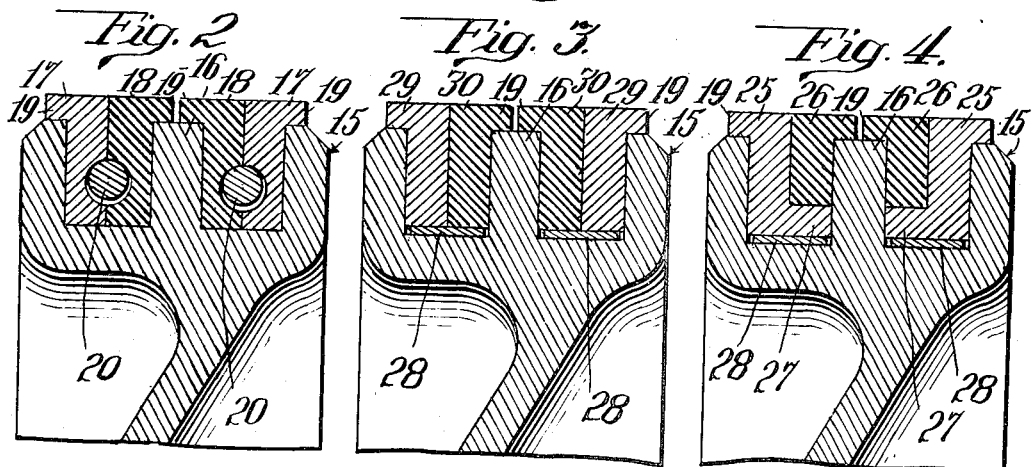
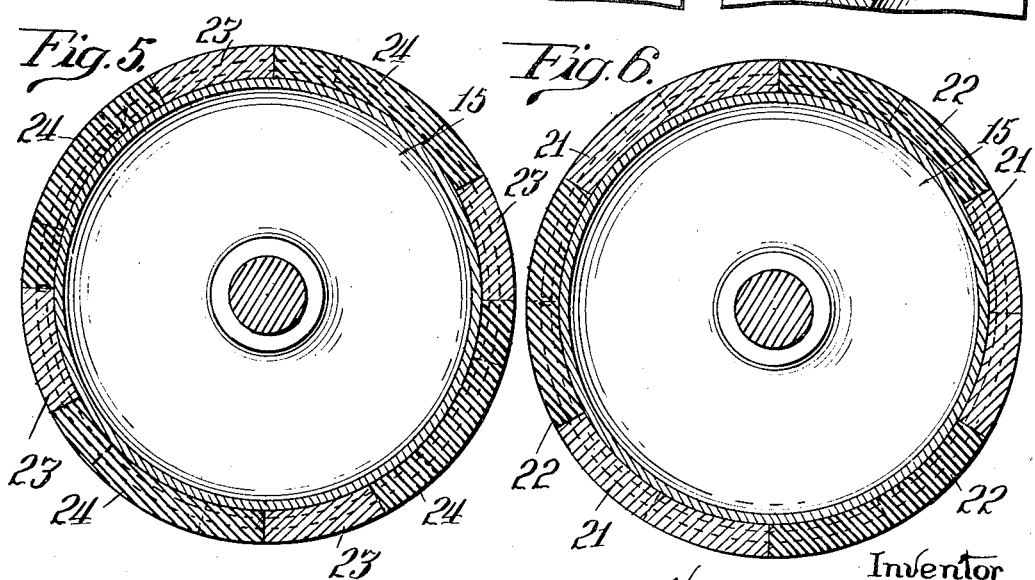

2,237,010

UNITED STATES PATENT OFFICE 2,237,010

PISTON RING ASSEMBLY

Henry E. Muchnic, Atchison, Kans., assignor to The Locomotive Finished Material Company, Atchison, Kans., a corporation of Kansas Application April 30, 1937, Serial No. 139,916

8 Claims. (Cl. 309—29)

My invention relates to a sectional type of piston or packing ring and more especially the type of ring adapted to be employed with the pistons of the steam cylinders of steam engines, which is composed of a plurality of segmental sections circumferentially arranged in a suitable annular groove or grooves in the piston.

The prime object and the advantages of my invention reside in the provision of a composite sectional piston ring arranged in parallel rows wherein each row consists of segmental sections arranged in end to end relation while the sections of the different rows are arranged in side-to-side abutting relation; the sections being either of equal or unequal length and the sections of each circumferential row composed, alternately, of relatively hard wearing metal and relatively soft wearing metal.

One object of the invention is to provide a composite piston ring involving segmental sections composed of metals having different characteristics and the respective sections arranged so as to counteract any tendency toward undue or rapid wear of the sections of the one metal as against those of the other metal; while at the same time providing for a better balanced piston than is the case where each half or member of a ring unit is entirely composed either of the one metal or of the other.

That is to say, my invention contemplates forming each half or annular part of the ring unit of segmental sections of bronze and segmental sections of iron arranged in alternate relation thus providing the necessary equalizing effect and protection of the iron sections for the bronze sections while at the same time obtaining the beneficial or advantageous characteristics of the bronze sections during the reciprocatory movements of the piston.

The respective sections are formed and arranged to have substantially uniform bearing relation with the walls of the cylinder in which the piston is employed and hence the relatively softer metal or bronze sections will afford a desirable surface on the cylinder walls for the relatively harder metal or iron sections with the result that there is less wear of both ring sections and a better seal is provided.

My improved piston ring assembly preferably involves a plurality of segmental sections arranged in circumferential rows disposed in parallel and operative relation; the respective segmental sections having various forms, in cross-section, some of which are disclosed in the exemplifications shown in the accompanying drawing, wherein:

Figure 1 is a peripheral side elevation of a piston involving my invention.

Figure 2 is a cross-sectional view, taken for example on the line 2—2 of Figure 1 and illustrating one form of the ring assembly.

Figure 3 is a similar view illustrating another form of the ring assembly.

Figure 4 is a similar view showing a further modification of the ring assembly.

Figure 5 is a sectional view taken substantially along the line 5—5 of Figure 1, as viewed by the arrows.

Figure 6 is a view similar to Figure 5 but illustrating a modification.

For purposes of exemplification, I have chosen to illustrate my invention in connection with what may be termed as a two ring unit type, namely wherein each unit is composed of two circumferential rows of segmental sections and the sections of the two rows arranged in side-to-side relation; although it will be understood that any number of ring units may be employed.

The piston is generally indicated at 15, with its peripheral portion provided with a pair of parallelly arranged circumferential channels spaced apart to provide an intervening wall 16 as shown in Figures 2, 3 and 4. In the particular exemplification, the side walls of the channels are shown straight and parallel throughout, but the channels may have somewhat different form if desired.

The rings consist of a suitable number of complemental segmental sections of predetermined length; the sections of the different rows of each ring unit being of similar cross-sectional configuration, in Figures 2 and 3.

In Figure 2, the segmental sections 17 are preferably composed of a relatively hard metal; such as iron, while the sections 18 are composed of a relatively soft metal, preferably bronze.

All of the sections are shown provided with peripheral flanges or lips 19; the lips 19 being arranged in overhanging relation with the peripheral wall portions of the piston.

The abutting sides of the sections in adjacent rows are provided with arcuate grooves extending from end to end of each section, with the grooves of the side-to-side sections combining to form a circumferential socket or recess adapted to receive the expanding element or split ring 20.

The segmental sections 17 and 18 may be either of equal size or length as shown in Figure 6 where the sections composed of relatively hard metal, such as iron, are indicated at 21, and the sections composed of relatively soft metal, such as bronze, are indicated at 22; or the sections 17 and 18 may be of unequal size or length as shown in Figure 5 where the sections composed of relatively hard metal are indicated at 23 and the sections of relatively soft metal are identified as 24.

It will be understood, of course, that any number of sections may be employed in keeping with the circumference of the piston and the length of sections; and the sections of the one row may be arranged in staggered or lapping relation with the sections of the adjacent row so that the junctures between the respective sections of one row will not register with the junctures between the sections of the other row.

It will also be understood that instead of employing long sections of comparatively soft metal, such as bronze, as shown in Figure 5, the long sections when desired, in keeping with certain operating conditions, may be composed of relatively hard metal—iron—and the short sections then composed of relatively soft metal.

With the sections of one metal made of uniform length and longer than the sections of the other metal, it is apparent that the desired distribution of the wearing characteristics of the different metals may be obtained without restriction to a given circumferential point on the piston.

The invention, as previously stated, lends itself to ring sections of different cross-sectional configuration, as for example in Figure 4 where the segmental sections 25 are of greater radial thickness or depth than the segmental sections 26; the sections 25 being provided at their outer perimeters with the laterally disposed flanges or lips 19, like the sections in Figure 2, while the sections 25 at their inner perimeters are enlarged laterally to provide the shoulders or base portions 27 on which the adjacent segmental sections 26 rest; the sections 26, like sections 18, also having lips 19 arranged to overhang the intermediate wall portion 16 of the piston. In this construction, the segmental sections 26 are preferably of a relatively soft metal, such as bronze, while sections 25 are preferably of relatively hard metal or iron.

The ring units composed of sections 25 and 26 in Figure 4 are forced radially outward by the flat expander 28.

In Figure 3, the ring units are composed of segmental sections 29 and 30 of equal radial dimensions like sections 17 and 18 of Figure 2; the sections 29 and 30 being forced radially outward by means of the flat expander 28.

As previously stated, the sections of adjacent rows are preferably arranged so as to stagger the junctures between the end-abutting sections as indicated by the dotted lines in Figures 5 and 6; it being understood, of course, that the lengths of the respective sections relative to the adjacent sections in the same circumferential row may vary to suit the conditions in which the piston is to operate.

In practice it has been found that in localities called good water districts, such as the Eastern section of this country and on the Pacific coast, iron rings have given satisfactory service; while in what are known as the hard water sections of the country—such as the desert region—bronze rings have had much longer life than iron rings. Between the extremes a combination of iron and bronze has given good results and with my invention it is possible to vary the ratio between the amount of iron and amount of bronze used to meet the particular water or operating conditions and hence the user is not limited to a fixed ratio between the iron and the bronze, such as a half-and-half combination or arrangement.

While I have shown and described the ring sections arranged in staggered relation in each half of the ring, the ring assembly is free to rotate in the groove or channel and it is therefore evident that all portions of the bushing or cylinder wall are eventually wiped by both a soft metal section and a hard metal section.

As previously stated, the number and dimensions of the sections, as well as the cross-sectional configuration of the sections, may be varied without departing from the spirit of my invention as defined by the appended claims.

What I claim is:

1. A piston ring assembly comprising a plurality of segmental sections arranged in a circumferential row; certain of the sections being composed of relatively hard metal and certain of the sections being composed of relatively soft metal; alternate sections in the same row being of the same metal.

2. A piston ring assembly comprising a plurality of segmental sections arranged in different circumferential rows and the segments of the adjacent row arranged in side-to-side relation; certain sections of each row being composed of relatively hard metal while the other sections of each row are composed of relatively soft metal; the sections of the different rows being arranged so that sections of the one metal are in side-to-side relation with the sections of the other metal.

3. A piston ring assembly comprising a plurality of segmental sections adapted to have movement in a radial direction, certain of the sections being composed of relatively hard metal while the other sections are composed of relatively soft metal, the alternate sections of the ring being of the same metal and of longer dimensions than the intervening sections.

4. A piston ring assembly comprising a plurality of segmental sections arranged in parallel circumferential rows and in side-to-side relation; the alternate sections of each row being composed of relatively hard metal while the other sections are composed of relatively soft metal, the alternate sections of the different rows being of longer dimensions than the intervening sections of the same row, the sections of the different rows being arranged with the short sections of one row contiguous to the long sections in the other row.

5. A piston ring assembly comprising a plurality of segmental sections, alternate sections being composed of iron while the intervening sections are composed of bronze.

6. A piston ring assembly comprising a plurality of segmental sections arranged in different circumferential rows, alternate sections of each row being composed of iron while the intervening sections are composed of bronze; the iron sections of one row being arranged in substantially the same plane, transversely of the rows, as the bronze sections of the other row.

7. A piston ring assembly comprising, in combination with a piston provided with a circumferential groove, a plurality of segmental sections composed of relatively hard metal and relatively soft metal arranged in circumferential rows and in face-to-face relation in the groove of the piston, with the sections of the different metal so arranged that in the reciprocatory movement of the piston the entire cylinder wall will be wiped by the sections composed of the relatively soft metal.

8. A piston ring assembly comprising, in combination with a piston provided with a circumferential groove, a plurality of segmental sections composed of relatively hard metal and relatively soft metal arranged in circumferential rows and in face-to-face relation in the groove of the piston, with the sections of the different metal so arranged that in the reciprocatory movement of the piston the entire cylinder wall will be wiped by the sections composed of the relatively soft metal, and an expander element whereby the ring sections are radially forced outward.

HENRY E. MUCHNIC.